United States Patent
Borreman et al.

(10) Patent No.: US 6,389,191 B1
(45) Date of Patent: May 14, 2002

(54) THERMO-OPTICAL CASCADED SWITCH COMPRISING GATES

(75) Inventors: Albert Borreman, Apeldoorn; Berend Hendriksen, Westervoort; Tsjerk Hans Hoekstra, Dieren, all of (NL); Anthony J. Ticknor, Half Moon Bay, CA (US)

(73) Assignee: JDS Uniphase Inc., Nepean (CA)

(*) Notice: Subject to any disclaimer, the term of this patent is extended or adjusted under 35 U.S.C. 154(b) by 0 days.

(21) Appl. No.: 09/478,510

(22) Filed: Jan. 6, 2000

Related U.S. Application Data

(63) Continuation of application No. PCT/EP98/04020, filed on Jun. 29, 1998.

(51) Int. Cl.[7] .................................................. G02B 6/26
(52) U.S. Cl. ........................... 385/22; 385/16; 385/24; 385/42; 385/45
(58) Field of Search .............................. 385/15–24, 42, 385/46, 47, 48, 50, 139, 44, 45, 2, 8

(56) References Cited

U.S. PATENT DOCUMENTS

| | | | |
|---|---|---|---|
| 5,418,868 A | 5/1995 | Cohen et al. | 385/16 |
| 5,623,566 A | * 4/1997 | Lee et al. | 385/24 |
| 6,064,787 A | * 5/2000 | Castoldi | 385/41 |

FOREIGN PATENT DOCUMENTS

| | | | |
|---|---|---|---|
| DE | WO 96/08932 | 3/1996 | H04Q/3/52 |
| DE | WO 96/23389 | 8/1996 | H04Q/3/52 |
| EP | 0 353 871 | 7/1989 | G02F/1/31 |
| EP | WO 96/38756 | 12/1996 | G02F/1/313 |
| GB | WO 90/00757 | 1/1990 | G02F/1/31 |

OTHER PUBLICATIONS

Okayama et al, "Polarisation–Independent Optical Switch with Cascaded Optical Switch Matrices", Electronics Letters, vol. 24, No. 15, Jul. 21, 1988, pp. 959–961.

Okayama et al, "Optical Switch Matrix with Simplified N×N Tree Structure" Journal of Lightwave Technology, vol. 7, No. 7, Jul. 1989, pp. 1023–1028.

* cited by examiner

Primary Examiner—Hemang Sanghavi
(74) Attorney, Agent, or Firm—Randy W. Lacasse; Kevin E. Greene; Lacasse & Associates

(57) ABSTRACT

The invention pertains to a thermo-optical switch comprising a cascade of 1×M optical switches, gates for selectively blocking and unblocking the output paths of the cascaded switch, and means for driving the 1×M switches and the gates, which means are arranged to switch a data signal from an input path of the cascaded switch to one of the output paths, wherein the said means are also arranged to switch an unwanted signal, by means of a number of the remaining 1×M switches, to at least one of the remaining output paths. In the cascaded switch according to the invention, the generated heat is distributed evenly over the area of the switch and the overall amount of heat generated is reduced.

19 Claims, 4 Drawing Sheets

THERMO-OPTICAL CASCADED SWITCH COMPRISING GATES

CROSS-REFERENCE TO RELATED APPLICATIONS

This application is continuation of International application PCT/EP98/04020 filed Jun. 29, 1998 which claims priorty of U.S. application Ser. No. 08/888,731, Jul. 7, 1997, now abandoned.

STATEMENT REGARDING FEDERALLY SPONSORED RESEARCH OR DEVELOPMENT

"Not Applicable"

REFERENCE TO A MICROFICHE APPENDIX

"Not Applicable"

BACKGROUND OF THE INVENTION

1. Field of the Invention

The invention pertains to a thermo-optical switch comprising a cascade of 1×M optical switches, gates for selectively blocking and unblocking the output paths of the cascaded switch, and means for driving the 1×M switches (M being an integer, preferably 2 or 3) and the gates, which means are arranged to switch a data signal from an input path of the cascaded switch to one of the output paths.

2. Description of Related Art

Such switches are known. WO 96/38756 discloses a thermo-optical switch with "additional branches" forming y-junctions with the actual output paths. As is explained in the description of said patent application, the additional branch is used to direct unwanted light away from the actual output path when this output is in the off-state. By doing so, the detrimental effect of the said light on both crosstalk and extinction (which are defined as 10*log(optical power in an output in the off-state/optical power in the input) and 10*log (optical power in an output in the on-state/optical power in an output in the off-state), respectively) is dispensed with before it reaches the output in the off-state.

WO 96/08932 describes a cascaded 1×8 switch consisting of three switch stages of 1×2 switches (1st stage: 1 switch, 2nd stage: 2 switches, and 3rd stage: 4 switches) and one shutter stage of 8 1×2 switches, functioning as gates for selectively blocking and unblocking the output paths of the cascaded switch. The cascaded switch according to WO 96/08932 is also said to exhibit greatly improved crosstalk suppression.

In the known cascaded optical switches a signal at the input path is directed to the selected output path by operating the 1×M, usually 1×2 switches, which are comprised in the cascaded or tree-structured switch. Since none of these 1×M switches has an infinite extinction, an unwanted signal is inevitably generated in each of the 1×M switches through which the data signal passes to the selected output. In the cascaded switches according to, e.g., WO 96/38756, detrimental effects of the unwanted signal can avoided by directing this signal away from the actual outputs by means of the gates.

In order to optimise extinction and crosstalk suppression, it is possible to activate all the gates in the last stage. Of course, the gates belonging to an output path which is in the on-state are used to direct the signal to the actual output path (the gate, in that case, is unblocking and in the off-state), whereas all the other gates in the last stage are activated to direct the unwanted signal away from the remaining outputs (these gates are blocking and in the on-state).

Now, in view of the present developments in the field of, amongst others, telecommunications, the requirements for thermo-optical cascaded switches are becoming ever more stringent. Reliability and life-expectancy should increase, the number of output paths (at present usually 8, in the future probably 16, 32 or 64) of the cascaded switches should also increase, and power consumption should decrease, all at an equal or, preferably, improved extinction ratio.

BRIEF SUMMARY OF THE INVENTION

The object of the present invention is to meet said demand, and this is achieved in the thermo-optical cascaded switch described in the opening paragraph wherein the means for driving the 1×M switches and the gates are also arranged to switch an unwanted signal (generated by 1×M switch through which the data signal passes), by means of a number of the remaining 1×M switches (i.e., those switches which are not used to switch the data signal to the output in the on-state), to at least one of the remaining output paths (i.e., the output paths in the off-state) and to block these output paths.

Surprisingly, it was found that by using the remaining 1×M switches for switching unwanted signals towards one or more particular output paths and blocking the output path(s) in question by means of a gate, (most on the other gates need not be activated. As will be demonstrated below, the total number of 1×M switches and gates that must be activated can thus be reduced (dramatically) in cascaded thermo-optical switches having a large number of output paths and, consequently, the power consumption and the heat generated in the cascaded switch can be reduced considerably, which in turn leads to increased reliability and life-expectancy of the cascaded switch.

Further, unlike in the case where all the gates in the last stage are activated, the activated 1×M switches and gates are no longer concentrated in a small area, but instead distributed more evenly over the area of the cascaded switch. This is all the more advantageous since the gates are normally located near the pigtails (interconnections between the switch and the optical fibres), which are sensitive to high temperatures and temperature changes. In contrast, the 1×M switches are further removed from the pigtails and, hence, high temperatures and large temperature changes in these 1×M switches will have considerably less effect on the pigtails. Also, the even distribution of activated 1×M switches and gates will result in improved transportation of heat into the substrate on which the switch is built.

In a preferred embodiment the means for driving the 1×M switches and the gates are so arranged as to switch the unwanted signals generated in each of the 1×M switches through which the data signal passes to at least one of the remaining output paths by means of a number of the remaining 1×M switches. Thus, all first order crosstalk originating from the data signal is consistently (and actively) switched to a blocking gate.

As mentioned above, the number of activated heaters in cascaded switches consisting of 1×2 switches and having 8, 16, 32, or 64 activated heaters is (considerably) reduced by using the drive tables according to the present invention. For drive tables activating all the gates the number of activated heaters is at least 11, 20, 37, and 70, respectively, whereas the drive tables of the above-mentioned preferred embodiment of the present invention allow activating only 10, 15, 21, and 28 heaters, i.e., a reduction of 1, 5, 16, and 42 activated heaters, respectively.

DETAILED DESCRIPTION OF THE INVENTION

Figure 1:
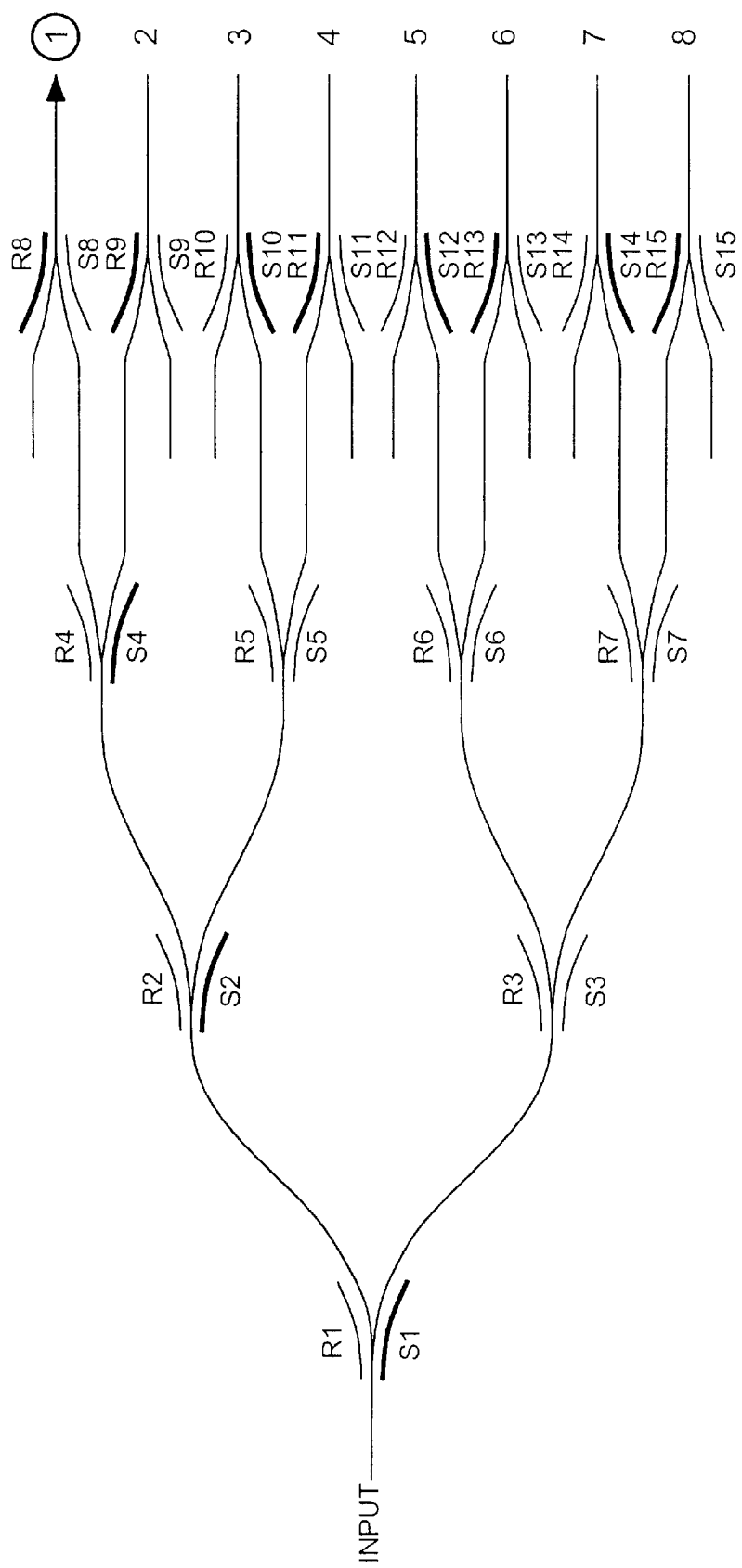
FIG. 1 shows a prior art cascaded thermo-optical 1×8 switch.
Figure 2:
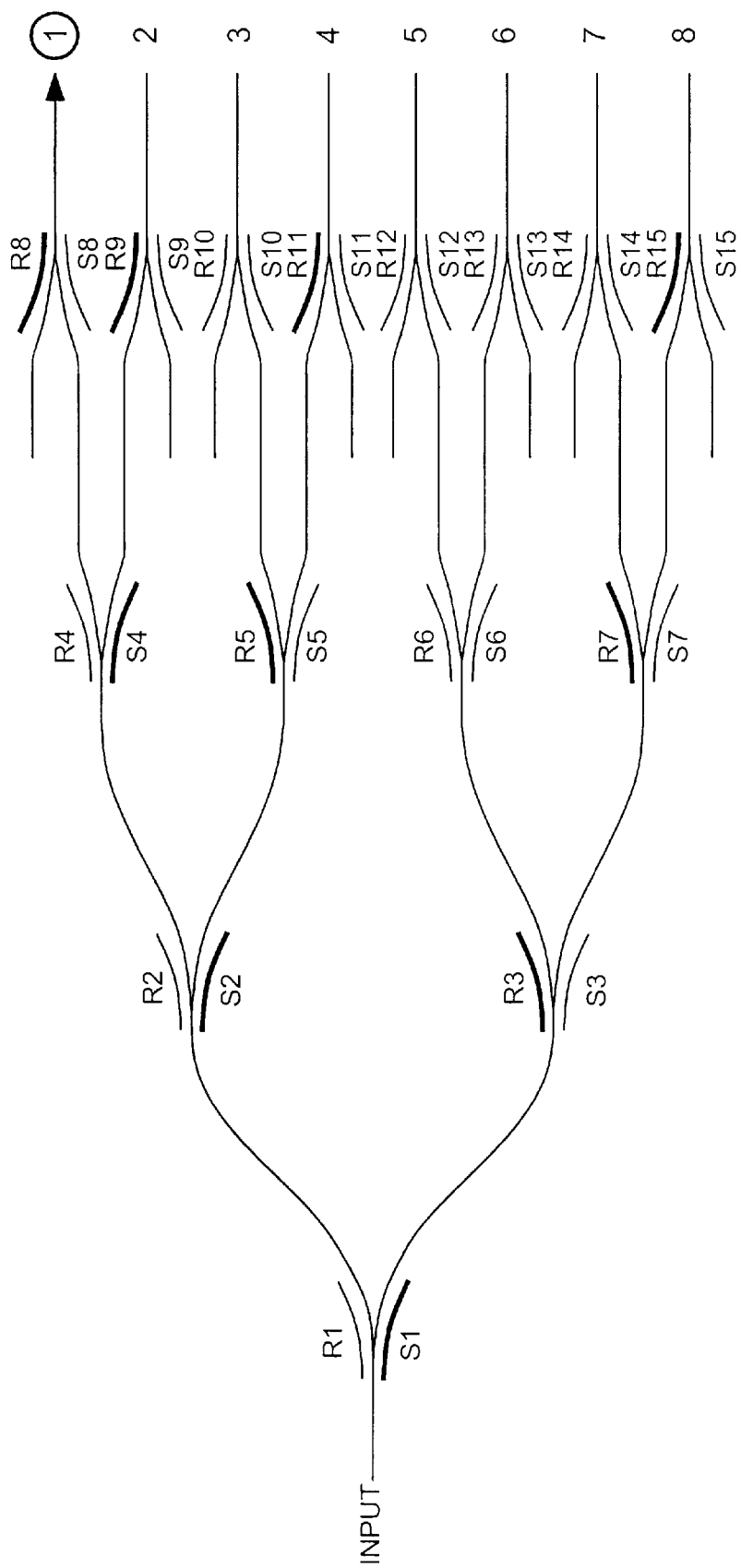
FIG. 2 shows a cascaded thermo-optical 1×8 switch in accordance with the present invention.

Tables 1 and 2, accompanied by FIGS. 1 and 2 (aspect ratio 1:60, i.e., the width over length ratio is much smaller in reality) give the drive tables for a cascaded thermo-optical 1×8 switch comprising a gate at each output (1×8 solid state optical switch Beambox™ ex Akzo Nobel NV). Table 1 shows a drive table which activates all gates, Table 2 shows a drive table in accordance with the present invention. In the said figures, the activated heaters are denoted by a thick line, whereas the non-activated heaters are denoted by a thin line.

In the columns numbered 1–8 the activated heaters in each of the 1×2 switches 1–15 are given. For switches 1–7: "S" or "R" means that the right and the left heater, respectively, are activated (the data signal is switched to the branch farthest from the activated heater). For switches 8–15 (each of which comprises a gate and an actual output): "on" means that the heater blocking the actual output is activated and "off" means that the heater unblocking the actual output is activated (the actual output is in the on-state when the gate is in the "off" state). For all switches: "—" means that no heater is activated at all, "Extinc." gives the measured extinction ratio (in dB and using a wavelength of 1536 nm) of the output in the on-state and the output in the off-state exhibiting the highest crosstalk, and "NA" means that no measured value of the extinction in a particular state of the cascaded switch is available.

TABLE 1

(All gates activated)
Prior Art

| Switch no. | Output path no. in on-state | | | | | | | |
|---|---|---|---|---|---|---|---|---|
| | 1 | 2 | 3 | 4 | 5 | 6 | 7 | 8 |
| 1 | S | S | S | S | R | R | R | R |
| 2 | S | S | R | R | S | S | R | R |
| 3 | — | — | — | — | — | — | — | — |
| 4 | S | R | — | — | — | — | — | — |
| 5 | — | — | — | R | — | — | — | — |
| 6 | — | — | — | — | S | R | — | — |
| 7 | — | — | — | — | — | — | S | R |
| 8 | off | on | on | on | on | on | on | on |
| 9 | on | off | on | on | on | on | on | on |
| 10 | on | on | off | on | on | on | on | on |
| 11 | on | on | on | off | on | on | on | on |
| 12 | on | on | on | on | off | on | on | on |
| 13 | on | on | on | on | on | off | on | on |
| 14 | on | on | on | on | on | on | off | on |
| 15 | on | on | on | on | on | on | on | off |
| Extinc. | 31 | 31 | 29 | 29 | 26 | 28 | 31 | 31 |

TABLE 2

(Optimised for spatial distribution)

| Switch no. | Output path no. in on-state | | | | | | | |
|---|---|---|---|---|---|---|---|---|
| | 1 | 2 | 3 | 4 | 5 | 6 | 7 | 8 |
| 1 | S | S | S | S | R | R | R | R |
| 2 | S | S | R | R | S | S | S | S |
| 3 | R | R | R | R | S | S | R | R |
| 4 | S | R | S | S | S | S | S | S |
| 5 | R | R | S | R | — | — | — | — |
| 6 | — | — | — | — | S | R | S | S |
| 7 | R | R | R | R | R | R | S | R |
| 8 | off | on | on | on | on | on | on | on |
| 9 | on | off | — | — | — | — | — | — |
| 10 | — | — | off | on | — | — | — | — |
| 11 | on | on | on | off | — | — | — | — |
| 12 | — | — | — | — | off | on | on | on |
| 13 | — | — | — | — | on | off | — | — |
| 14 | — | — | — | — | — | — | off | on |
| 15 | on | on | on | on | off | on | on | off |
| Extinc. | 30 | 29 | 28 | 31 | 27 | 29 | 33 | 31 |

It is clear from these Tables and the related Figures that the activated heaters are reduced in number (as mentioned, the impact of this effect of the invention increases sharply with the number of outputs and is, therefore, more convincingly present in, e.g., 1×16 and larger cascaded switches) and distributed much more evenly over the area of the switch (see Figures). The increase in the life-time of the switch is about 25%.

In a further preferred embodiment, the means for driving the 1×M switches and the gates are arranged so that for at least half of the states of the cascaded switch at least one of the unwanted signals is switched to different blocked output paths.

Figure 3:
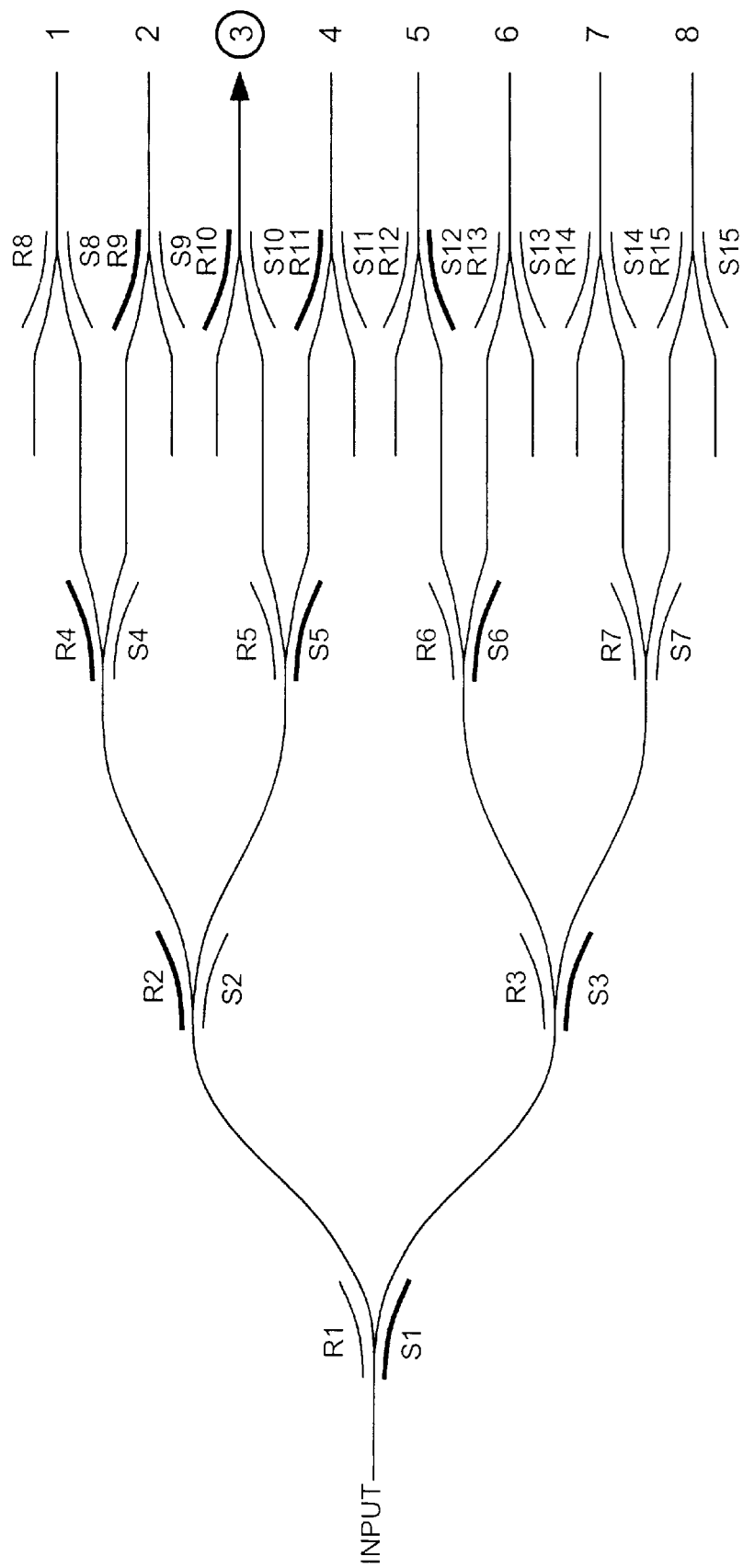
FIG. 3 shows the cascaded thermo-optical 1×8 switch of FIG. 2 arranged so that for at least half of the states of the cascaded switch at least one of the unwanted signals is switched to different blocked output paths.

An example of a drive table satisfying these requirements is shown in Table 3 and FIG. 3. The cascaded switch could be looked upon as comprising two "sub-cascades," one sprouting from and including switch no. 2 (having heaters R2 and S2 in FIG. 3) leading to output paths 1–14 and one sprouting from and including switch no. 3 (having heaters R3 and S3 in FIG. 3) leading to output paths 5–8. If the state of the cascaded switch is changed from, say, state 1 to state 3, the unwanted signal is switched towards output path 5 instead of output path 8, and the state of the gates is altered accordingly.

By using this drive table, the switches and gates in a cascaded switch that spends nearly equal time in each state (1–8) in the course of its life (which is the best a-priori assumption one can make without knowing specifically otherwise) will receive approximately equal amounts of heat, thus making uniform ageing much more likely and further prolonging the useful life of the cascaded switch.

TABLE 3

(Optimised for distribution in time)

| Switch no. | Output path no. in on-state | | | | | | | |
|---|---|---|---|---|---|---|---|---|
| | 1 | 2 | 3 | 4 | 5 | 6 | 7 | 8 |
| 1 | S | S | S | S | R | R | R | R |
| 2 | S | S | R | R | R | R | S | S |
| 3 | R | R | S | S | S | S | R | R |
| 4 | S | R | R | R | — | — | 3 | S |
| 5 | S | S | S | R | R | R | — | — |
| 6 | — | — | S | S | S | R | R | R |

TABLE 3-continued (Optimised for distribution in time)

| | Output path no. in on-state | | | | | | | |
|---|---|---|---|---|---|---|---|---|
| Switch no. | 1 | 2 | 3 | 4 | 5 | 6 | 7 | 8 |
| 7 | R | R | — | — | S | S | S | R |
| 8 | off | on | — | — | — | — | on | on |
| 9 | on | off | on | on | — | — | — | — |
| 1o | on | on | off | on | — | — | — | — |
| 11 | — | — | on | off | on | on | — | — |
| 12 | — | — | on | on | off | on | — | — |
| 13 | — | — | — | — | on | off | on | on |
| 14 | — | — | — | — | on | on | off | on |
| 15 | on | on | — | — | — | — | on | off |
| Extinc. | 30 | 29 | NA | NA | NA | NA | 33 | 31 |

Figure 4:
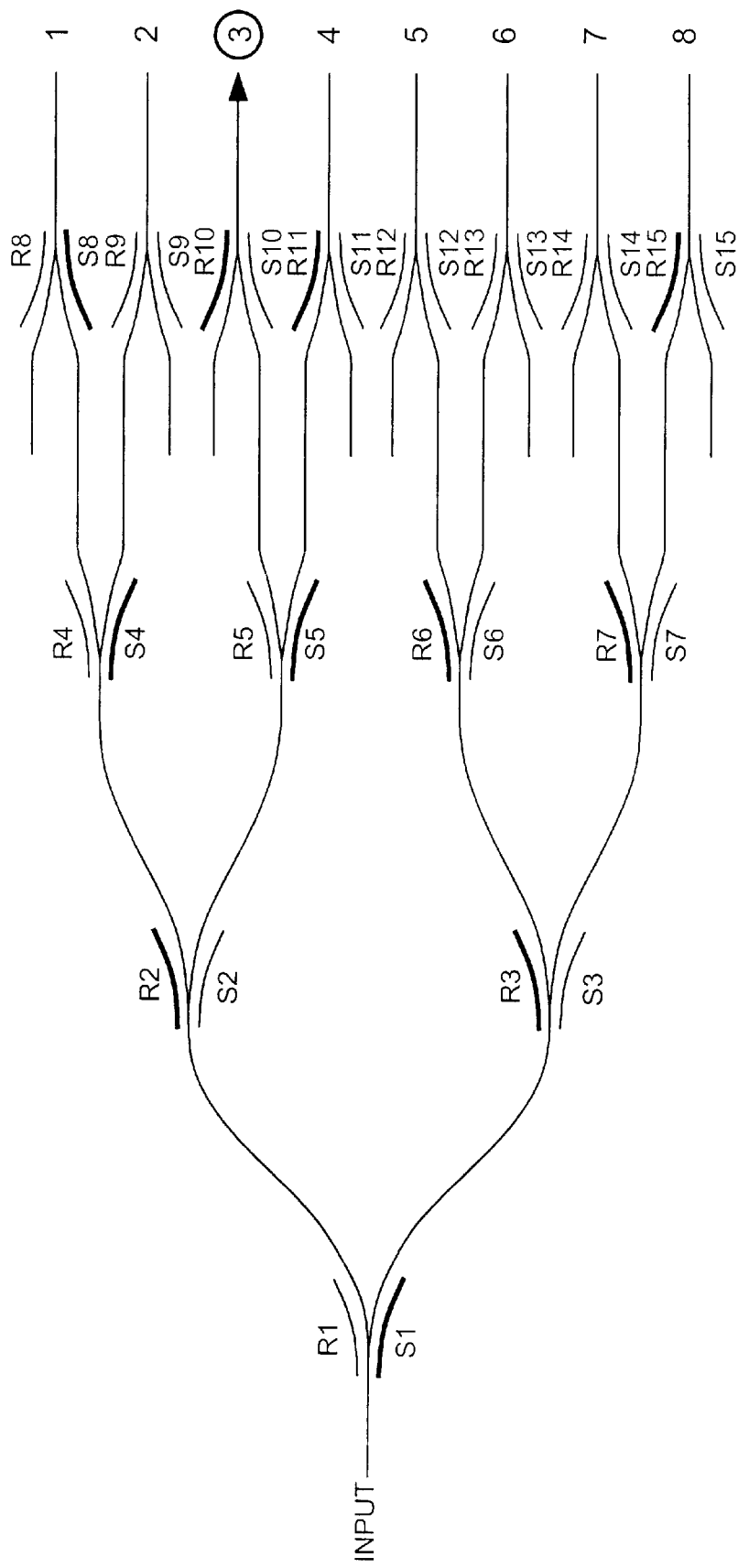
FIG. 4 shows the cascaded thermo-optical 1×8 switch of FIG. 2 arranged to suppress radiation modes by switching unwanted signals away from an imaginary line through the input path.

In most optical switches radiation modes (leaking from the waveguides into the cladding of the cascaded switch) are generated which, when recaptured by the output paths of the cascaded switch, contribute to crosstalk and reduce extinction. The detrimental effects of the radiation modes, also referred to as "stray light," can be suppressed by capturing and/or absorbing them by means of, e.g., so-called dummy waveguides. It was found, however, that the effects of radiation modes can also be suppressed by using a drive table which causes unwanted signals to be switched away from an imaginary line through the input path. An example of such a drive table is shown in Table 4 and FIG. 4. Comparison with Tables 1 and 2 shows a substantial improvement of the extinction for states 3–6, which improvement results at least partly results from the suppression of the effects of the radiation modes.

TABLE 4

(Influence of stray light minimised)

| | Output path no. in on-state | | | |
|---|---|---|---|---|
| Switch no. | 3 | 4 | 5 | 6 |
| 1 | S | S | R | R |
| 2 | R | R | S | S |
| 3 | R | R | S | S |
| 4 | S | S | S | S |
| 5 | S | R | S | S |
| 6 | R | R | S | R |
| 7 | R | R | R | R |
| on | on | on | on | on |
| 9 | — | — | — | — |
| 1o | off | on | — | — |
| 11 | on | off | — | — |
| 12 | — | — | off | on |
| 13 | — | — | on | off |
| 14 | — | — | — | — |
| 15 | on | on | on | on |
| Extinc. | 33 | 33 | 32 | 31 |

Of course, it is possible to combine the drive tables. An example of this is shown in Table 5, which represents a combination of the essential features of the drive tables as shown in Tables 2 and 3.

TABLE 5

(Example of combined drive tables)

| | Output path no. in on-state | | | | | | | |
|---|---|---|---|---|---|---|---|---|
| Switch no. | 1 | 2 | 3 | 4 | 5 | 6 | 7 | 8 |
| 1 | S | S | S | S | R | R | R | R |
| 2 | S | S | R | R | S | S | R | R |
| 3 | S | S | R | R | S | S | R | R |
| 4 | S | R | R | R | S | R | — | — |
| 5 | S | R | R | R | — | — | S | R |
| 6 | S | R | — | — | S | R | S | R |
| 7 | — | — | S | R | S | R | S | R |
| 8 | off | on | on | — | on | — | — | — |
| 9 | on | off | — | on | — | on | — | — |
| 10 | on | — | off | on | — | — | on | — |
| 11 | — | on | on | off | — | — | — | on |
| 12 | on | — | — | — | off | on | on | — |
| 13 | — | on | — | — | on | off | — | on |
| 14 | — | — | on | — | on | — | off | on |
| 15 | — | — | — | — | on | — | on | off |

It preferred that the cascaded switch is a thermo-optical 1×N or N×1 switch preferably with N being equal to 8, 16, 32, or 64, because such switches can be readily used as basic building blocks in optical matrices and networks.

The invention also pertains to a device (e.g., an N×N optical switch matrix) equipped with a thermo-optical switch as described above and to a method for driving a thermo-optical switch comprising a cascade of 1×M optical switches, gates for selectively blocking and unblocking the output paths of the cascaded switch, and means for driving the 1×M switches and the gates, which method comprises switching a data signal from an input path of the cascaded switch to a selected output path, switching an unwanted signal, by means of a number of the remaining 1×M switches, to at least one of the remaining output paths, and blocking these remaining output paths.

In a preferred embodiment of the said method an unwanted signal generated in each of the 1×M switches through which the signal passes is switched to at least one of the remaining (and blocked) output paths by means of a number of the remaining 1×M switches.

It is also preferred that for at least half of the states of the cascaded switch an unwanted signal is switched to different (blocked) output paths and/or that the unwanted signals are switched away from an imaginary line through the input path of the cascaded switch.

For details concerning the theory on which the operation of thermo-optical switches is based and details about suitable materials and manufacturing methods reference may be had to WO 96/38756.

For completeness' sake, it is noted that in WO 96/23389 a multi-stage N×N space-switching arrangement is disclosed which comprises 1×M pyramids of 1×2 switches. Switches which are not included in a connection path are deployed to damp the crosstalk. However, it is explicitly stated that gates for blocking the outputs of the 1×M pyramids, which gates are essential to the present invention, should not be used.

It should further be noted that WO 90/00757 concerns a "binary tree switching network." The network consists of a number of stages each of which comprises a number of switches. There is simultaneous ("binary") operation of the switches per stage and, therefore, distributed driving as suggested by the present invention is excluded.

A thermo-optical switch is defined as a switch in which the operation of both the elementary 1×M optical switches and the gates for selectively blocking and unblocking the output paths of the cascaded switch is based on thermally induced refractive index differences or changes in the waveguides of the said 1×M switches and gates.

As will be clear from the above, the gates serve to selectively block and unblock the output paths of the cascaded switch to either let a data signal pass or to prevent unwanted signals from reaching the outputs of the cascaded switch. Other suitable terms for gates are, e.g., "shutter" and "idle port" (depending, amongst others, on the configuration of the gates). Suitable configurations are, e.g., additional branches, cut-off waveguides, and Mach-Zehnder interferometers.

The term "switches" includes both the 1×M switches for switching the data signal to one of the outputs and switchable combinations of a gate and an output path. A cascaded or tree-structured switch is a P×N switch (with N normally being 8, 16, 32, or 64 and P preferably being 1) built up of stages of 1×M switches and a shutter stage. The term "unwanted signal" comprises the signals resulting from crosstalk in the 1×M switches and captured stray light.

The "means for driving the 1×M switches and the gates" may take the form of, e.g., a personal computer, EPROM, Programmable Array Logic, Discrete Logic or a Micro Controller.

What is claimed is:

1. A thermo-optical switch having an input path and output paths, said switch comprising a cascade of 1×M optical switches, gates for selectively blocking and unblocking the output paths, and means for driving the 1×M optical switches and the gates, said means arranged to switch a data signal from the input path to one of the output paths, characterised in that said means are also arranged to switch an unwanted signal, via a plurality of remaining 1×M switches, to at least one remaining output path and to block this output path.

2. A thermo-optical switch according to claim 1, characterised in that said means are arranged to switch unwanted signals generated in each of the 1×M switches through which the data signal passes to at least one remaining output path via a plurality of remaining 1×M switches.

3. A thermo-optical switch according to claim 2, characterised in that said means are adapted to switch the unwanted signals away from an imaginary line through the input path.

4. A thermo-optical switch according to claim 2, characterised in that for at least half of the states of the switch at least one of the unwanted signals is switched to different output paths.

5. A thermo-optical switch according to claim 4, characterised in that said means are adapted to switch the unwanted signals away from an imaginary line through the input path.

6. A thermo-optical switch according to claim 4, having an input and N outputs or N inputs and an output, where N is an integer.

7. A thermo-optical switch according to claim 5, having an input and N outputs or N inputs and an output where N is an integer.

8. A thermo-optical switch according to claim 1, characterised in that for at least half of the states of the switch at least one unwanted signal is switched to different output paths.

9. A thermo-optical switch according to claim 8, characterised in that said means are adapted to switch the unwanted signal away from an imaginary line through the input path.

10. A thermo-optical switch according to claim 1, characterised in that said means are adapted to switch the unwanted signal away from an imaginary line through the input path.

11. A thermo-optical switch according to claim 1, having an input and N outputs or N inputs and an output, where N is an integer.

12. A method for driving a thermo-optical switch having an input path and output paths and comprising a cascade of 1×M optical switches, gates for selectively blocking and unblocking the output paths of the thermo-optical switch, and means for driving the 1×M optical switches and the gates, said method comprising the step of switching a data signal from the input path to a selected output path, characterised in that an unwanted signal is switched, via a plurality of remaining 1×M switches, to at least one remaining output path which is blocked.

13. A method according to claim 12, characterised in that unwanted signals generated in each of the 1×M switches through which the data signal passes are switched to at least one remaining output path via a plurality of the remaining 1×M switches.

14. A method according to claim 13, characterised in that for at least half of the states of the thermo-optical switch at least one unwanted signal is switched to different output paths.

15. A method according to claim 14, characterised in that the unwanted signals are switched away from an imaginary line through the input path.

16. A method according to claim 13, characterised in that the unwanted signals are switched away from an imaginary line through the input path.

17. A method according to claim 12, characterised in that for at least half of the states of the thermo-optical switch at least one unwanted signal is switched to different output paths.

18. A method according to claim 17, characterised in that the unwanted signal is switched away from an imaginary line through the input path.

19. A method according to claim 12, characterised in that the unwanted signal is switched away from an imaginary line through the input path.

* * * * *